United States Patent
Kamm et al.

(10) Patent No.: US 10,764,260 B2
(45) Date of Patent: Sep. 1, 2020

(54) DISTRIBUTED PROCESSING OF A PRODUCT ON THE BASIS OF CENTRALLY ENCRYPTED STORED DATA

(71) Applicant: Giesecke+Devrient Mobile Security GmbH, Müchen (DE)

(72) Inventors: Frank-Michael Kamm, Oberhaching (DE); Volker Stöhr, Müchen (DE)

(73) Assignee: Giesecke+Devrient Mobile Security GmbH, Munich (DE)

( * ) Notice: Subject to any disclaimer, the term of this patent is extended or adjusted under 35 U.S.C. 154(b) by 208 days.

(21) Appl. No.: 15/545,393

(22) PCT Filed: Jan. 22, 2016

(86) PCT No.: PCT/EP2016/000125
§ 371 (c)(1),
(2) Date: Jul. 21, 2017

(87) PCT Pub. No.: WO2016/116282
PCT Pub. Date: Jul. 28, 2016

(65) Prior Publication Data
US 2017/0374041 A1    Dec. 28, 2017

(30) Foreign Application Priority Data
Jan. 23, 2015    (DE) .......... 10 2015 000 895

(51) Int. Cl.
*H04L 9/08*    (2006.01)
*G06Q 10/08*    (2012.01)
(Continued)

(52) U.S. Cl.
CPC ....... *H04L 63/0442* (2013.01); *G06Q 10/087* (2013.01); *H04L 9/088* (2013.01);
(Continued)

(58) Field of Classification Search
CPC .. G06Q 10/087; G06Q 50/04; G06Q 10/0883; G05B 19/418; H04L 63/0428;
(Continued)

(56) References Cited

U.S. PATENT DOCUMENTS

| 7,679,511 B2 | 3/2010 | Lauper |
| 8,224,852 B2 | 7/2012 | Falk et al. |

(Continued)

FOREIGN PATENT DOCUMENTS

| DE | 102007045776 A1 | 4/2009 |
| DE | 102013019487 A1 | 5/2015 |

(Continued)

OTHER PUBLICATIONS

International Search Report from PCT Application No. PCT/EP2016/000125, dated Mar. 21, 2016.
German Office Action from DE Application No. 102015000895.1, dated Sep. 8, 2015.
German Office Action from DE Application No. 102015000895.1, dated Feb. 2, 2016.

*Primary Examiner* — Daniel B Potratz
*Assistant Examiner* — D'Arcy Winston Straub
(74) *Attorney, Agent, or Firm* — Workman Nydegger

(57) ABSTRACT

The invention provides a system for encryptedly storing product data of a product having an attached tag centrally on a product data server, and reading out the centrally stored product data by production stations which are to process the product. The product data are encrypted with a document key which in turn is encrypted with a public key of the tag. The tag contains access information for the centrally stored product data. When a production station accesses product data on the product data server, the tag carries out a re-encryption of the document key from the key system of the tag to that of the accessing production station.

17 Claims, 4 Drawing Sheets

(51) Int. Cl.
*H04L 9/14* (2006.01)
*H04L 9/30* (2006.01)
*H04L 9/32* (2006.01)
*H04L 29/06* (2006.01)
*G06Q 50/04* (2012.01)

(52) U.S. Cl.
CPC .............. *H04L 9/0822* (2013.01); *H04L 9/14* (2013.01); *H04L 9/30* (2013.01); *H04L 9/3247* (2013.01); *H04L 63/0428* (2013.01); *H04L 63/08* (2013.01); *G06Q 10/0833* (2013.01); *G06Q 50/04* (2013.01); *H04L 9/0897* (2013.01); *H04L 2209/805* (2013.01); *H04L 2463/062* (2013.01)

(58) Field of Classification Search
CPC ................ H04L 63/08; H04L 2209/805; H04L 2463/062; H04L 9/0822; H04L 9/088; H04L 9/14; H04L 9/30; H04L 9/0888–0897
See application file for complete search history.

(56) References Cited

U.S. PATENT DOCUMENTS

| | | | |
|---|---|---|---|
| 9,792,472 B1 * | 10/2017 | Robshaw | H04L 9/3271 |
| 2007/0016479 A1 | 1/2007 | Lauper | |
| 2010/0198873 A1 | 8/2010 | Falk et al. | |
| 2011/0279235 A1 * | 11/2011 | Lee | H04L 9/3271 |
| | | | 340/10.1 |
| 2011/0320805 A1 * | 12/2011 | Chaves | H04L 63/0428 |
| | | | 713/150 |
| 2014/0059352 A1 | 2/2014 | Haga et al. | |
| 2014/0089658 A1 * | 3/2014 | Raghuram | G06F 9/45533 |
| | | | 713/155 |

FOREIGN PATENT DOCUMENTS

| | | |
|---|---|---|
| EP | 1577824 A1 | 9/2005 |
| WO | 2009040273 A1 | 4/2009 |

\* cited by examiner

DISTRIBUTED PROCESSING OF A PRODUCT ON THE BASIS OF CENTRALLY ENCRYPTED STORED DATA

FIELD OF THE INVENTION

The invention relates to a system and method for the distributed processing of centrally encryptedly stored data.

PRIOR ART

In production logistics, products are equipped with product tags, called tags for short, in particular contactless tags, for example RFID tags, in which product data about the product are stored electronically. By means of a (contactless) reader (e.g. RFID reader), the product data can be read out from the tag and in this way the properties of the present product be ascertained, as well as writing entries to the tag be carried out. In a very simple case, (only) a product ID, thus identity, can be stored in the tag as product data.

Especially more complex products are typically processed in a production chain at several consecutive production stations. In this case, production data from the preceding production steps, by which production steps to be performed in the product are influenced, can be stored as product data in the tag. A production station which receives the product reads out the tag and as a result of this finds out which production steps are (hereinafter still) to be performed in the product. After the production station has carried out the production steps corresponding to the specifications in the tag, the production station possibly performs writing entries in the product data, for example to communicate relevant data to a subsequent station as to the next production steps to be carried out.

Complex product data, in particular production data, can exceed the storage capacity of a simple contactless tag. A solution to this problem provides that only access information (e.g. a URL=Universally Resource Locator) for the product data is stored the product tag attached to the product, and that the product data themselves are stored on a remote product data server, "in the cloud", reachable over a communication network work. By means of the access information, the product data can be retrieved from the product data server and new or changed product data be stored in the product data server.

If product data are confidential, secret or are worthy of protection for other reasons, they are frequently deposited on the product data server in encrypted form. In a production chain with several production stations, the encrypted storage of the product data produces the problem to be solved of allowing every production station access to the production data in plain text (thus in unencrypted form). In particular, production steps at a production station frequently build upon production steps at preceding production stations. For this purpose, each production station has to perform writing operations on the product data and make the changed product data available to the subsequent production stations. When several production stations are accessing the same product data, it is moreover important to provide measures for checking the authenticity of the product data and the trustworthiness of accessing production stations.

The German patent application DE 102013019487.3 describes a method for securely storage data in a cloud server. There, the data are stored in the cloud server in a form encrypted with a document key. The document key is encrypted with a public key of a security instance different from the cloud server and is likewise stored in the cloud memory. The security instance, which also has the private key belonging to the public key, can decrypt the document key, whereas the cloud server cannot. The security instance makes the decrypted document key available to an authorized user for decrypting data.

The solution from DE 102013019487.3 would also be applicable when accessing production data by a production chain in which several companies are involved. For this, each production station would have to, on the one hand, contact the cloud server, and on the other hand, call up the security instance to have the document key decrypted, to subsequently be able to decrypt the product data itself. In this case all participants of the production chain would have to trust the security instance beyond company boundaries, and the operator of the security instance would have to permit access by non-company production stations.

SUMMARY OF THE INVENTION

The invention is based on the object of providing a reliable system and method for the distributed processing, in particular storing and reading out, of centrally encryptedly stored data, in which several production stations require access to the product data in plain text.

This object is achieved by a system as well as a method and a tag as described herein. Advantageous embodiments of the invention are also described herein.

The system is devised for storing and reading out product data. It comprises: —a product data server on which a product data file is centrally stored or storable, in which are comprised: —the product data in a form encrypted with a document key, and —the document keys in a form encrypted with a public key of an asymmetric key pair; —a product; —a tag attached to the product in decentralized fashion in which access information is stored or storable for the product data file on the product data server; —at least a decentralized production station, or several production stations, which is or are devised for processing the product according to the product data.

The system is characterized in that:—an asymmetric key pair is stored in the tag, comprising a private tag key and a public tag key, wherein the private tag key is inaccessible to the production station;—an asymmetric key pair is stored in the production station comprising a private station key and a public station key;—an encryption device is devised in the tag; and—the product data in the product data file on the product data server are encrypted with the public tag key.

The tags are compact and mobile, and can therefore easily be attached to products (comprising intermediate products). At the same time, larger amounts of data which are associated with a tag (e.g. production history, process data from production steps, information about prescribed and production steps still to be carried out) can be deposited in the cloud on the product data server. In particular for delivery chains across companies, the utilization of a cloud service is thus enabled. The provision of own asymmetric key pairs in the tag and in all production stations enables a central storing of the product data encrypted with the document key, and of the encrypted document key with a universal key system, namely that of the tag. Because the key system of the tag is employed and not that of the product data server, the product data server, as a pure cloud service provider, is moreover excluded from access to the product data in plain text. At the same time, in interaction with the encryption device of the tag, the possibility is supplied of carrying out in the tag a re-encryption from the key system of the tag to the key system of production station requesting product data. By the principle of re-encrypting, neither the product data server of the cloud provider nor unauthorized users (e.g. unauthorized production stations or attackers) can access the product data. In spite of the external memory location, the product data thus remain secure. The re-encryption requires that the authorized user, in the form of the production station, is actually in the contact with the tag, that is, the (intermediate) product with the tag is thus physically present. In contrast, processing product data without there being present a product and tag is effectively prevented.

Hence a reliable system and method for the distributed processing of encryptedly centrally stored data is provided herein in which several production stations have access possibility to the product data in plain text.

In comparison to the solution from DE 102013019487.3, moreover the challenge is bypassed that an arrangement has to be achieved among all involved production stations on a universally approved security instance. Therefore the solution according to the invention is advantageously applicable precisely for production chains which extend across several organizational units (e.g. several companies).

Electively, the encryption device in the tag is devised for:

in the case when the production station wants to store product data, which have been encrypted with the document key, on the product data server, to supply the public tag key to the production station so that the production station can encrypt the document key with the public tag key; or/and in the case when, while employing the access information from the tag, the product data file is read out from the product server to the production station, to re-encrypt the encrypted document key from the public tag key to the public station key (e.g. to first decrypt with the private tag key and to then newly encrypt with the public station key) and to supply the hereby re-encrypted document key to the production station.

A method for storing product data by the production station on the product data server may further comprise the mutually complementary file creation steps and/or storage steps. Fundamentally, the production station encrypts the product data with either a self-generated or alternatively procured document key, and the document key with the public key of the tag, and writes both thereby created ciphertexts to a product data file. The product data file is deposited on the product data server in the cloud. The product data server in turn sends access information (e.g. URL), which enables accessing the stored product data file, to the production station. The production station sends the access information further to the tag, which stores it with itself (in the tag). Therefore, the product data are stored in the cloud and the link to the product data in the tag. The key system employed for the encryption is that of the tag.

Electively the method further comprises the steps:—upon the reading out of the public tag key from the tag to the production station, mutual authentication between the tag and the production station; or/and—upon the sending of the access information from the product data server to the production station, mutual authentication between the product data server and the production station.

Electively, a station signature is generated—on the occasion of sending the access information from the production station to the tag—by means of the private station key, the station signature with the access information sent to the tag, as well as the station signature stored in the tag.

A method for reading out product data by the production station may comprise the production station reading out the access information from the tag and with the access information the product data file from the product data server.

The production station lets the document key encrypted in the tag system be re-encrypted by the tag to the station's key system. The production station can itself decrypt the re-encrypted document key with its own private key. With the thus obtained document key, the production station can decrypt the product data.

The readout method comprises electively further the steps:

upon the reading out of the access information from the tag: establishing a secure communication channel between the tag and the production station, or/and mutual authentication between the tag and the production station; or/and after the reading out of the access information from the tag: by the production station, authenticating the access information, in particular by verifying a signature added to the access information and generated with a private station key (in particular of that production station which has stored the product data on the product server) by means of the corresponding public station key.

Electively, there is carried out, upon storing and/or equally upon reading out product data, the authentication of the production station vis-à-vis the product data server, which is effected upon the mutual authentication, by means of an authentication token sent from the tag to the production station, and electively moreover generated by the tag.

Electively, at least some public keys, preferably all public keys, are verifiable by means of the tag, in particular by means of a certificate stored in the tag and issued by a certifying body for the respective public key. Electively, every owner (tag or production station) of a key pair also carries the appropriate certificate issued by the certifying body, with which the respective public key is verifiable. In this way, tag and production stations can verify the public keys of the respective other parties (other production station or tag).

In a tag according to the invention, an asymmetric key pair is stored comprising a private tag key and a public tag key. The private tag key is inaccessible for production station which access the product data server via the tag.

An encryption device is provided in the tag, which is devised for supplying the public tag key for encrypting the document key to the production station when a production station wants to store product data encrypted with the document key on the product data server. The production station can now encrypt the document key with the public tag key and deposit them together with the encrypted product data in a product data file on the product data server.

The encryption device is further devised for when a production station, while employing the access information from the tag, wants to read out a product data file from the product server, to re-encrypt the encrypted document key from the public tag key to the public station key for the production station and to supply the hereby re-encrypted document key to the production station. The production station can decrypt the re-encrypted document key with its own private key.

BRIEF DESCRIPTION OF THE DRAWINGS

Hereinafter, the invention will be explained more closely on the basis of exemplary embodiments and with reference to the drawings, in which are shown.

DETAILED DESCRIPTION OF EMBODIMENT EXAMPLES

Figure 1:
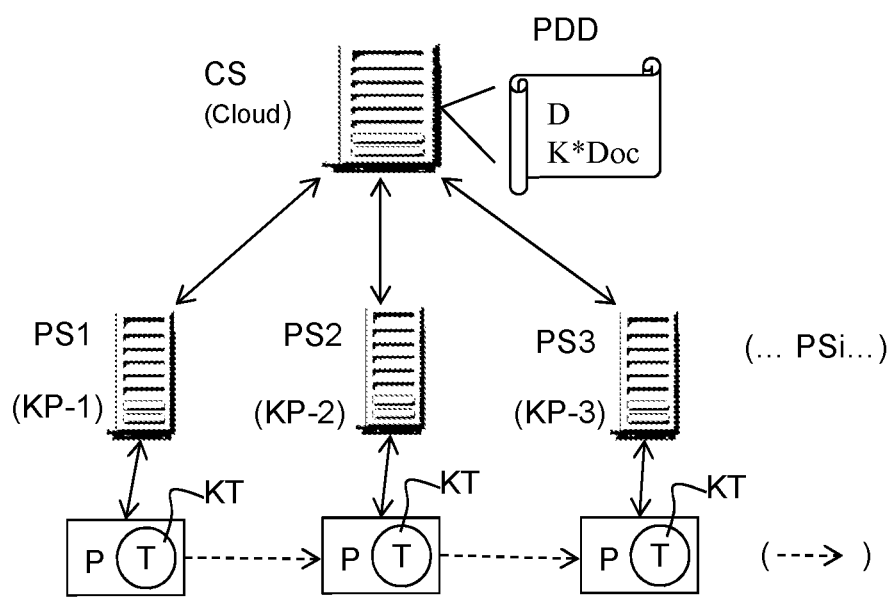
FIG. 1 a system for the illustration of the invention.

FIG. 1 shows, for the illustration of the invention, a system for the reading out and storing of product data PD.

The system comprises a product data server or cloud server CS on which product data are stored in a product data file PDD in the cloud.

The system further comprises several, here three by way of example, production stations PS1, PS2, PS3 at which a product P is to be processed. For processing, the product P is handed on from station to station, in the example from FIG. 1 in the order PS1, PS2, PS3, . . . . Each production station PSi carries out processing steps in the product P and in doing so builds on working steps which were carried out by preceding production stations PSj, j<i. Each of the production stations PS1, PS2, PS3, comprises a computer system. For the purposes of the invention, the production station PSi is equated with the computer system comprised therein. Functionalities of the production stations PSi provided for the processing of the product P are unimportant for the invention. What kind of product P is, is not relevant for the invention. The individual production stations PSi read out product data Doc from the product data server CS and as a result of this ascertain which production steps are to be carried out. Every production station PSi logs the production steps carried out by it by changes in the product data Doc and stores the changed product data Doc on the product data server CS for subsequent production stations. The product data Doc are stored in encrypted form Doc* in a product data file PDD on the product data server CS as described in detail further below.

An asymmetric key pair comprising a private station key and a public station key KP is respectively stored in the production stations PS1, 2, 3. The production stations PSi further comprises encryption devices.

In the product P, a contactless tag T is attached, in which access information URL for the product data file PDD on the product data server (cloud server) CS is stored. Further, an asymmetric key pair is stored in the tag T, comprising a private tag key PrivKeyTag and a public tag key KT=PubKeyTag. The private tag key is inaccessible for the production stations PSi, i=1, 2, 3(, . . . ). Further, an encryption device is devised in the tag T.

The product data Doc in the product data file PDD on the product data (cloud) server CS are encrypted with a document key KDoc, into D. The document key KDoc in turn is encrypted with the public tag key KT and stored as an encrypted document key K*Doc in the product data file PDD.

Figure 2:
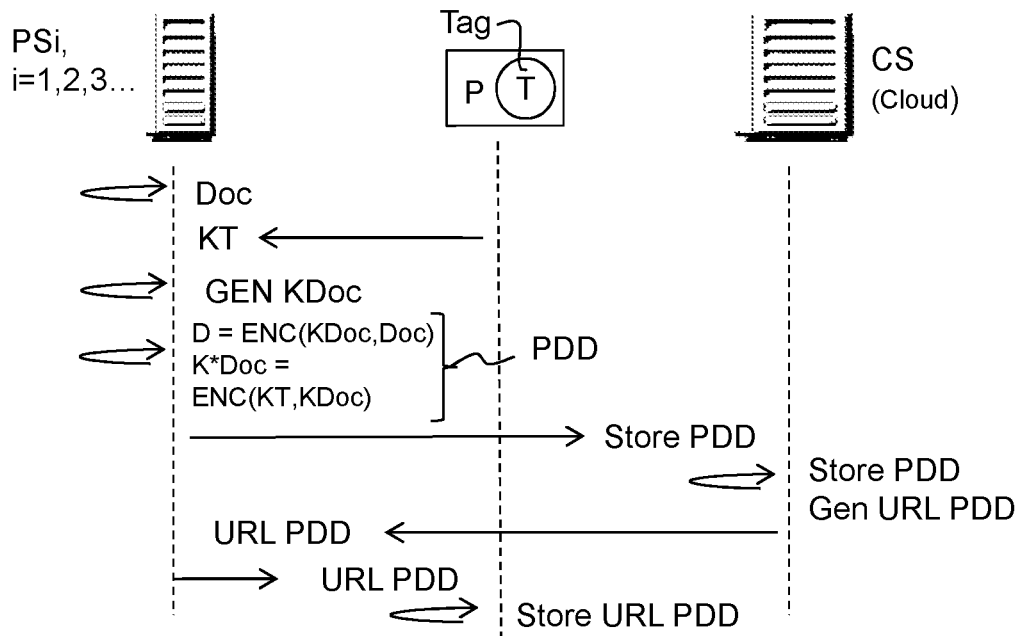
FIG. 2 a protocol diagram about the storing of product data from a production station on the product data server, according to a basic embodiment form of the invention.

FIG. 2 shows a protocol diagram about the storing of product data Doc of a production station PSi in the product data server CS, according to a basic embodiment form of the invention. First, the product data Doc are supplied at the production station PSi. A document key KDoc is either generated by the production station PSi itself or supplied in another way. The production station PSi encrypts the product data Doc with the document key KDoc into D=enc (KDoc, Doc). Further, the production station PSi reads out the public tag key KT from the tag T. This reading out can be effected before or after the encrypting of the product data Doc, the order is irrelevant. The production station PSi encrypts the document key KDoc with the tag key KT into K*Doc=enc (KT, KDoc). Further, the production station PSi generates a product data file PDD comprising the product data D encrypted with the document key KDoc, and the document key K*Doc encrypted with the public tag key KT. The production station PSi sends the product data file PDD to the product data server CS. The product data file PDD is stored on the product data server CS. Further, access information (i.e. a link) URL to the stored product data file PDD is generated by the product data server CS and sent to the production station PSi. The production station PSi sends the access information URL to the tag T, which stores the access information URL. Therefore, the product data Doc are stored encryptedly, as D, on the product data server CS, and access information URL to the product data file PDD (containing Doc) is stored in the tag T. The relevant keys for again reading out or decrypting the product data Doc are stored in the tag T.

Figure 3:
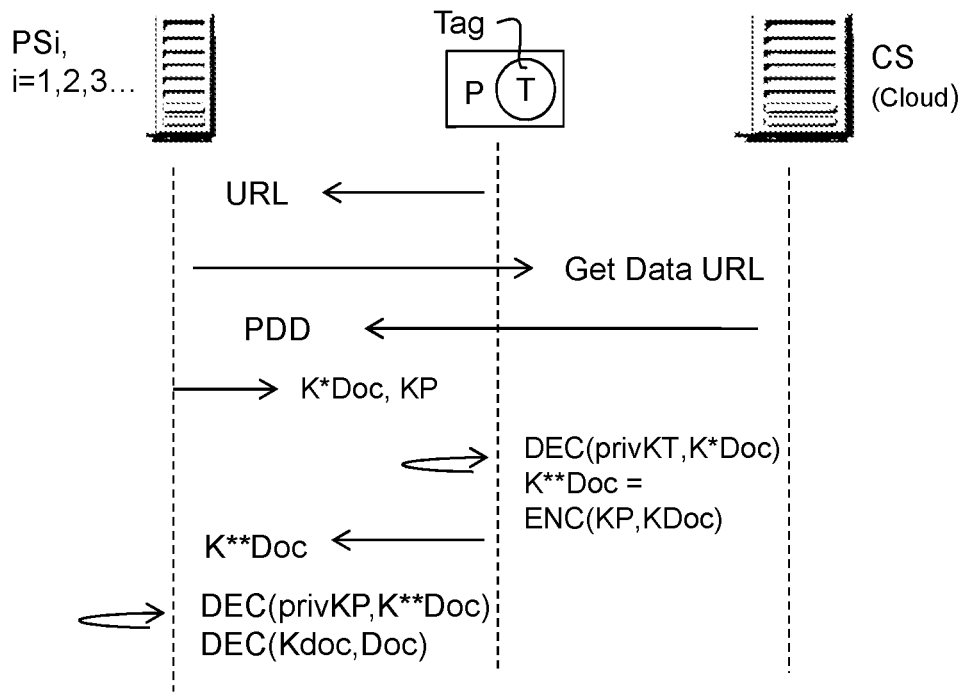
FIG. 3 a protocol diagram about the reading out of product data from a product data server to a production station, according to a basic embodiment form of the invention.

FIG. 3 shows a protocol diagram about the reading out of product data Doc from a product data server CS to a production station PSi, according to a basic embodiment form of the invention.

The production station PSi reads out the access information URL from the tag T and reads, while employing the access information URL read out from the tag T, the product data file PDD, comprising the encrypted product data D=enc (KDoc,Doc) and the encrypted document key K*Doc, from the product data server CS. The production station PSi transfers the encrypted document key K*Doc and its own public station key KP to the tag T. The tag T re-encrypts the document key K*Doc from the public tag key KT to the public station key KP. For re-encrypting, the tag T decrypts the encrypted document key K*Doc with its own private tag key and newly encrypts the document key KDoc, obtained in plain text as a result of this, with public station key KP obtained from the production station PSi into a ciphertext KDoc=enc(KP,KDoc). Thereafter, the tag T sends the re-encrypted document key KDoc to the production station PSi. The production station PSi decrypts the re-encrypted document key K**Doc with the production station's PSi own private key. With the document key KDoc obtained in plain text as a result of this, the production station PSi decrypts the product data D back to Doc.

Figure 4:
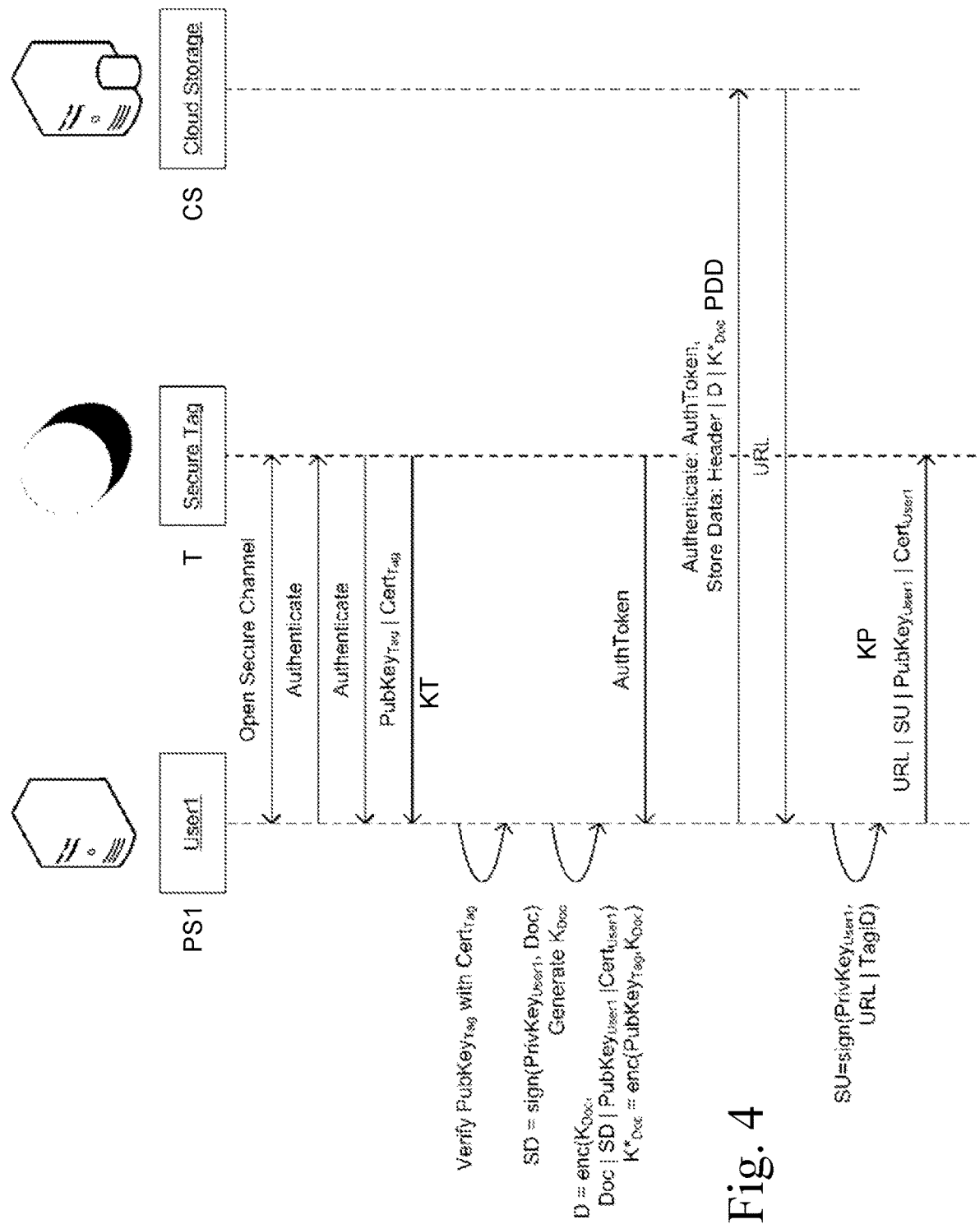
FIG. 4 a detailed protocol diagram about the storing of product data from a production station on the product data server, according to a more complex embodiment of the invention.

FIG. 4 shows a detailed protocol diagram about the storing of product data Doc from a production station PS1 on the product data server CS, according to a more complex embodiment of the invention. The product data Doc are supplied in a file. As opposed to the embodiment of FIG. 2, authentication steps are provided at several locations of the process flow as they are expedient in the practical implementation of the method. More precisely, prior to transferring the public tag key KT to the production station PS1, tag T and production station PS1 establish a secure communication channel. First, the production station PS1 (User1) authenticates vis-à-vis the tag (secure tag) T as indicated by the pseudo command code "Authenticate". Thereafter the tag T authenticates vis-à-vis the production station PS1 likewise with "Authenticate". Within the scope of the authentication, the public tag key KT can have been transferred to the production station PS1. If not, the public tag key KT=PubKey-Tag will now be transferred to the production station PS1. Further, the tag T transfers a certificate Cert-Tag to the production station PS1. The production station verifies the public tag key KT with the certificate Cert-Tag and the public key, known to the product station PSi, of the certifying body (CA, Certification Authority). Further, the production station PS1 generates, with its own private key PrivKey-User1, a signature SD via the product data Doc, according to SD=sign (PrivKey-User1, Doc). Thereupon the production station PS1 (=User1) generates a document key KDoc, forms a concatenation from the product data Doc, the signature, the own public key KP=PubKey-User1 and an own certificate Cert-User1, and encrypts the concatenation with the document key KDoc into a ciphertext D=enc(KDoc, Doc/SD/PubKey-User1/Cert-User1). The exact point in time of generating the document key KDoc is not decisive and can lie in particular before or after the signature generation SD. The production station PS1 encrypts the document key KDoc with the public tag key KT=PubKey-Tag into a ciphertext K*Doc. Next, the production station PS1 requests an authentication token from the tag T for authenticating vis-à-vis the product data server CS and is supplied the authentication token by the tag T. By means of the authentication token, the production station PS1 authenticates vis-à-vis the product data server CS. In the same communication session, the production station PS1 generates a product data file PDD which comprises the ciphertexts D and K*Doc, thus the encrypted product data Doc and the encrypted document key KDoc and a header with further information about the management of the product data file PDD, and sends them to the product data server CS. The product data file PDD is stored on the product data server CS. The product data server CS generates access information URL to the product data file PDD and sends back them to the production station PS1. The production station PS1 signs the access information URL and a tag identifier Tag-ID of tag T with its own private station key into a signature SU=sign(PrivKey-User1, URL/Tag-ID) and sends the access information URL, the signature SU, the certificate Cert-User1 and its own public station key KP to the tag T, which stores the sent data URL, SU, KP, Cert-User1 in the tag T. Instead of the signature SU, alternatively a tag signature can be stored in the tag, in particular a tag signature derived from the signature SU, so that the subsequent production stations, which read out the product data, do not have to trust the previous product station, but only the tag. The tag T now contains access information URL to encrypted product data PD on the product data server CS, as well as a signature SU and a public product station key KP, which enable a subsequent production station PSi to check whether an authorized production station has previously stored data in the tag T and in the product data server CS.

Figure 5:
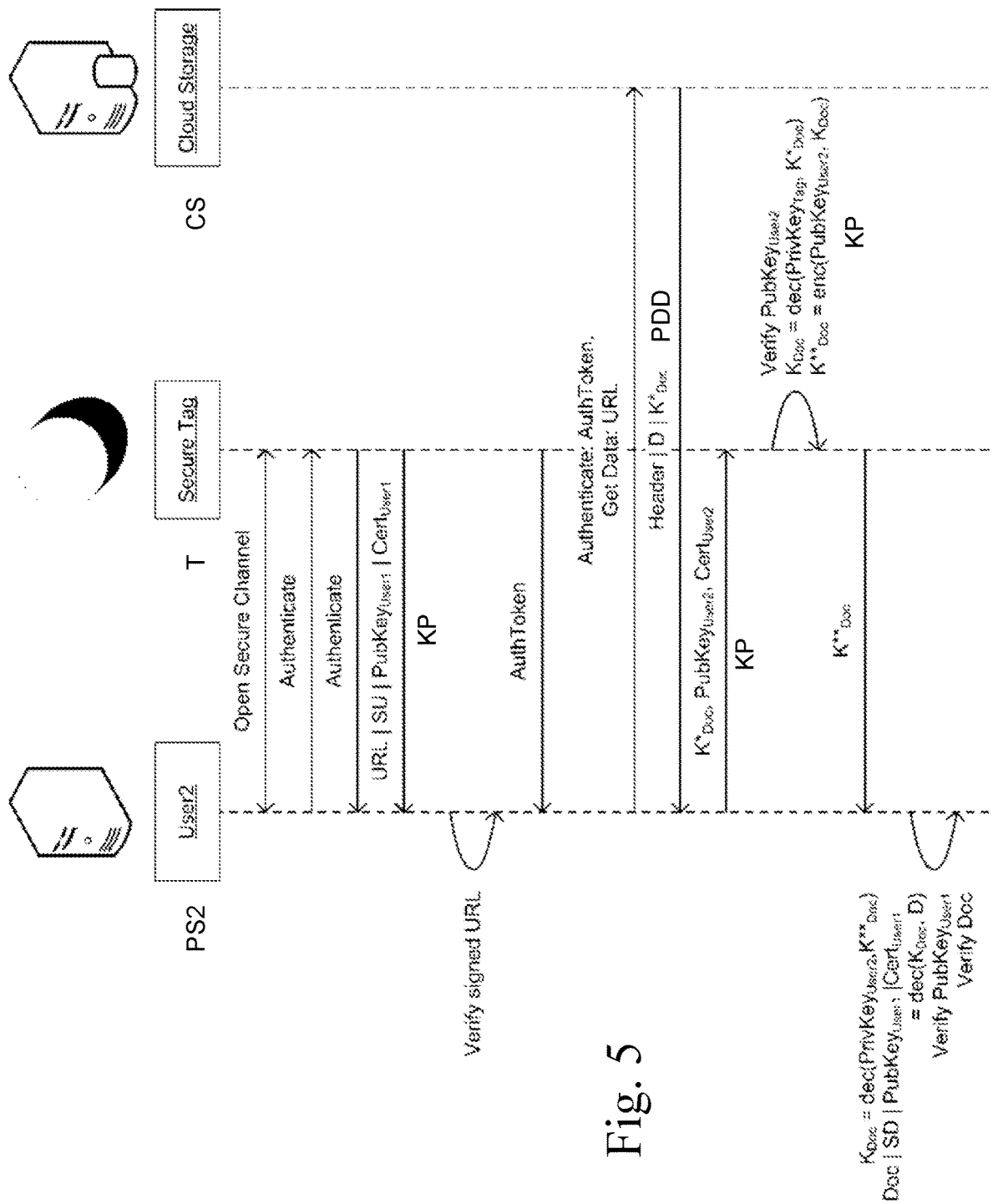
FIG. 5 a detailed protocol diagram about the reading out of product data from the product data server to a production station, according to a more complex embodiment of the invention.

FIG. 5 shows a detailed protocol diagram about the reading out of product data PD by the product data server CS to another, subsequent production station PS2=User2 than that PS1 from FIG. 4, according to a more complex embodiment of the invention, after a production station PS1 has carried out writing product data, e.g. according to FIG. 4. As opposed to the embodiment of FIG. 3, authentication steps are provided at several locations of the process flow as they are expedient in the practical implementation of the method. More precisely, prior to the transferring of the access information URL and the public tag key KT to the production station PS2, tag T and production station PS2 establish a secure communication channel. First, the production station PS2 (User2) authenticates vis-à-vis the tag (secure tag) T as indicated by the pseudo command code "Authenticate". Thereafter the tag T authenticates vis-à-vis the production station PS2, likewise with "Authenticate". The tag replies with the signed access information URL of the product data file PDD on the product data server (cloud server) CS. The production station PS2 verifies the correctness of the access information URL with the signature SU, the public key to KP=PubKey1 and the certificate Cert-User1, which the production station PS2 reads out from the tag T, and which the preceding production station PS1 has previously written to the tag T. Next, the production station PS2 requests an authentication token from the tag T for authenticating vis-à-vis the product data server CS and is supplied the authentication token by the tag T. By means of the authentication token, the production station PS2 authenticates vis-à-vis the product data server CS. In the same communication session, the production station PS2 sends a data read-out command "Get Data URL" to the product data server CS, with the request to send the data deposited in the memory location URL, thus the product data file PDD, to the production station PS2, and downloads, as a result of this, the product data file PDD (Header/D/K*Doc) (D=enc(KDoc, Doc/SD/PubKey-User1/Cert-User1)) from the product data server CS to the production station PS2. The production station PS2 extracts the document key K*Doc from the product data file PDD encrypted with the public tag key KT and sends it to the tag T, together with the own public station key KP=PubKey-User2 of the production station PS2 and an own certificate Cert-User2, created with the own private station key of the production station PS2. The tag T checks the public station key KP=PubKey-User2 of the production station PS2 with the certificate Cert-User2 by the command "Verify". Thereafter the tag T decrypts the encrypted document key K*Doc with the tag-own private tag key PrivKeyTag (KDoc=dec (PrivKeyTag, K*Doc)) and newly encrypts it with the public station key KP=PubKey-User2 of the production station PS2 (KDoc=enc (PubKeyUser2, KDoc)). The tag sends the newly encrypted document key KDoc to the production station PS2 (User2). The public key KP=PubKeyUser1, the certificate Cert-User1 and associated signatures were already read out together with the access information URL from the tag T or are contained in the product data file PDD. With its own private station key PrivKey-User2, the production station PS2 (User2) decrypts the newly encrypted document key K**Doc into the document key KDoc in plain text, and with this the product data Doc. With the attached certificate Cert-User1 of the document author, the production station PS2 verifies the correctness of the public station key KP=PubKey-User1 of the document author. With the signature SD of the document author and the public station key KP=PubKey-User1, the production station PS2 verifies the correctness of the document of the product data Doc.

The second production station PS2 thus now has the decrypted and verified product data Doc in plain text available, with all changes the preceding production station PS1 has performed in the product data Doc. In that context, the tag T has the function of itself supplying a public key KT=PubKey-Tag for the permanent encrypted storage of product data PD on the product data server CS. The tag T further has the function of carrying out upon request of a production station PSi a re-encryption of the public tag key KT=PubKey-Tag to the public station key KP=PubKey-Useri, i=1, 2, 3, . . . so that the requesting production station PSi, i=1, 2, 3, . . . gets the product data Doc in plain text.

In FIG. 4, 5 the method was described with two different, preferably consecutive production stations PS1, PS2. The method runs analogously when a single production station PSi accesses the product data file PDD on the product data server CS twice in a row.

The order of the steps can be divergent from the described order. However, security-critical operations, for example transfer or decryption of sensitive data, may be effected only after successful authentication.

An authentication of the production station PSi (user) vis-à-vis the tag is carried out so that no unauthorized attacker obtains the product data Doc to tamper with them or spy them out. An authentication of the tag T vis-à-vis the production station PS is carried out so that a tag T still tampered with in some way or a tag T which was supplied by an attacker, is not further employed. The steps establishment of a secure communication channel and authentication can be more or less separated from each other, or be realized in a single method as well, e.g. in a protocol for the authentication with key derivation.

The mutual authentication between tag T and user PS can be effected, for example, by means of asymmetric cryptographic methods. Each of the two partners possesses a key pair of a public and a private key, the public key is certified by a generally accepted Certification Authority (CA) and is thereby verifiable by the other partner. Certificate chains can be also employed. The authentication is then effected by challenge/responses methods.

Alternatively, more complex certification structures can also be used in scenarios having several companies: Each of the companies operates its own CA for certifying its users PS, besides which a tag issuer can also operate own CAs for certifying its tags T. By cross-certifying the CAs, users PS of several companies can thus work with tags T which are supplied by a tag issuer.

The mutual authentication and the thereto coupled establishing of a secure channel, over which then further messages can be arbitrarily exchanged, is a widespread method, in the field of smart cards (Secure Messaging) as well as on the Internet (e.g. SSL/TLS, IPsec). The secure channel then guarantees the authenticity, integrity and confidentiality of the subsequently exchanged messages.

Alternatively, a secure communication channel can be waived here, when instead the necessary security is guaranteed via special embodiment of the exchanged messages. How this can be implemented is shown in other patent applications filed or to be filed by the same applicant. Alternatively, a secure channel can be established which ensures only the authenticity and integrity of the exchanged messages, the confidentiality could be implemented via the special embodiment of the exchanged messages.

In the above-described procedures, the document with the product data Doc is signed for ensuring the authenticity and integrity before the storing by the user/production station PSi. Signature, public key and certificate of the user are encrypted together with the signed document and are stored on the product data server/cloud server CS. This has the consequence that when reading the data set with the product data Doc by another user/production station PSi, the data set first has to be decrypted before the signature can be checked. Only an authorized user/production station PSi is thus able to check the correctness of the document and also to ascertain the identity of the author.

In an alternative variant, the signature could be computed via the encrypted document D. Then the correctness of the data set D stored on the product data server/cloud server CS could be checked without having to decrypt it. The identity of the author would then be ascertainable also for non-authorized users. In a further variant, the signature can be computed by the tag T. Indeed, the correctness of the document Doc can then be verified, the author, however, remains anonymous. It would be ensured only that the author was an authorized user.

Different key (systems) or the same key can be employed for the authenticating vis-à-vis the communication partner, for the signing of the (product) data Doc and for the encrypting of the document key systems KDoc. If different keys are employed, several certificates also have to be present, made available to the partner and verified by him. Alternatively, a key can be made authentically available to a partner also by the fact that it is transferred via the secure communication channel, upon opening of which an authentication with another key has taken place.

The signing of the link URL is not compulsory for the security of the system. All requirements as to the security of the stored document D can also be attained by other means. With a signed URL, however, some tampering can be detected earlier. The correctness of the URL upon transferring can also be ensured by the secure channel between user and tag. Besides the URL, the signature should also protect the Tag-ID and possible further data.

If the secure channel between user/production station PSi and tag T also protects the confidentiality of the transferred messages, the encryption with the public key KP of the user PSi can be waived for the use case/case of application reading the document D upon the transmission of the document key KDoc from the tag T to the user/production station PSi.

Typically the writing or reading of data stored on the product data server/cloud provider CS requires an authentication of the user PSi. The method described above ensures the confidentiality of the document. Also, an attacker cannot insert self-generated documents unnoticedly. If, however, the cloud provider CS requires no authentication, an attacker could delete the stored document or make it unusable in another way. Ideally, the tag T supplies the authentication data (credentials) which the user PSi requires for authenticating with the cloud provider CS. This can be static authentication data/credentials (e.g. name and password) or better dynamic authentication data (e.g. OTP, one-time tokens, challenge response . . . ).

The invention claimed is:

1. A system for processing product data, including storing and reading out the product data, the system comprising:
   a product data server configured to store a product data file, wherein the product data file comprises the product data encrypted with a document key;
   a product;
   a tag, attached to the product, configured to store access information that provides access to the product data file stored on the product data server, an asymmetric key pair that comprises a private tag key and a public tag key, and an encryption device;
   a production station configured to process the product according to the product data and store an asymmetric key pair that comprises a public station key and a private station key, wherein the private tag key is inaccessible to the production station;
   wherein the document key is encrypted with the public tag key and stored in the product data file; and
   upon receiving the encrypted document key and the public station key from the production station, the tag is further configured to:

decrypt the encrypted document key with the private tag key to obtain a decrypted document key, newly encrypt the decrypted document key with the public station key obtained from the production station to obtain a re-encrypted document key, and provide the re-encrypted document key to the production station.

2. The system according to claim 1, wherein the encryption device in the tag performs the steps of:

upon encrypting the product data with the document key by the production station and storing the encrypted product data on the product data server, supplying the public tag key to the production station for encrypting the document key; and upon reading out the product data file from the product server to the production station via employing the access information from the tag, re-encrypting the encrypted document key from the public tag key to the public station key and supplying the hereby re-encrypted document key to the production station.

3. A method for creating a product data the for storing product data by a production station on a product data server of a system for processing the product data, the system including:

the product data server configured to store the product data file, wherein the data file comprises the product data encrypted with a document key, a product, a tag, attached to the product, configured to store access information that provides access to the product data file stored on the product data server, an asymmetric key pair that comprises a private tag key and a public tag key, and an encryption device, the production station configured to process the product according to the product data and store an asymmetric key pair that comprises a public station key and a private station key, wherein the private tag key is inaccessible to the production station, the method comprising the steps:

supplying the product data at the production station;

by the production station, generating or supplying the document key;

by the production station, encrypting at least the product data with the document key into encrypted product data;

by the production station, reading out the public tag key from the tag;

by the production station, encrypting the document key in the product data file on the product data server with the public tag key into an encrypted document key;

by the production station, generating the product data file comprising the encrypted product data and the encrypted document key, wherein upon receiving the encrypted document key and the public station key from the production station, the tag decrypts the encrypted document key with the private tag key to obtain a decrypted document key, newly encrypts the decrypted document key with the public station key obtained from the production station to obtain a re-encrypted document key, and provides the re-encrypted document key to the production station.

4. The method according to claim 3, further comprising: upon the reading out of the public tag key from the tag to the production station, establishing a mutual authentication between the tag and the production station.

5. The method according to claim 4, wherein an authentication of the production station by way of the product data server, which is effected upon a mutual authentication, is carried out by means of an electively static or dynamic authentication token sent from the lag to the production station, and electively generated by the tag.

6. The method according to claim 3, wherein at least one of the public keys is verifiable by the tag by means of a certificate, stored in the tag, for the respective public key.

7. A method for storing a product data the at a production station of a system for processing product data, the system including:

a product data server configured to store the product data file, wherein the product data the comprises the product data encrypted with a document key, a product, a tag, attached to the product, configured to store access information that provides access to the product data file stored on the product data server, an asymmetric key pair that comprises a private tag key and a public tag key, and an encryption device, the production station configured to process the product according to the product data and store an asymmetric key pair that comprises a public station key and a private station key, wherein the private tag key is inaccessible to the production station, the method comprising:

supplying the product data at the production station;

by the production station, generating or supplying the document key;

by the production station, encrypting at least the product data with the document key into encrypted product data;

by the production station, reading out the public tag key from the tag;

by the production station, encrypting the document key in the product data the on the product data server with the public tag key into an encrypted document key;

by the production station, generating a product data the comprising the encrypted product data and the encrypted document key;

by the production station, sending the product data the to the product data server;

storing, at the product data server, the product data file;

by the product data server, generating the access information for the stored product data file;

by the product data server, sending the access information to the production station;

by the production station, sending the access information to the tag; storing at the tag, the access information; and wherein upon receiving the encrypted document key and the public station key from the production station, the tag is configured to decrypt the encrypted document key with the private tag key to obtain a decrypted document key, newly encrypt the decrypted document key with the public station key obtained from the production station to obtain a re-encrypted document key, and provide the re-encrypted document key to the production station.

8. The method according to claim 7, further comprising: upon the sending of the access information from the product data server to the production station, establishing a mutual authentication between the product data server and the production station.

9. The method according to claim 7, wherein upon the sending of the access information from the production station to the tag, a station signature is generated by means of the private station key and sent to the tag with the access information, and the station signature is stored in the tag.

10. The method according to claim 9, wherein a tag signature is generated in the tag, the tag signature being derived from the station signature, and is stored in the tag.

11. A method for reading out encrypted product data by a production station of a system for processing product data, the system including:
- a product data server configured to store a product data file, wherein the product data file comprises the product data encrypted with a document key,
- a product,
- a tag, attached to the product, configured to store access information that provides access to the product data file stored on the product data server, an asymmetric key pair that comprises a private tag key and a public tag key, and an encryption device,
- the production station configured to process the product according to the product data and store an asymmetric key pair that comprises a public station key and a private station key, wherein the private station key is inaccessible to the product station, the method comprising the steps:
- by the production station, reading out the access information from the tag;
- by the production station, while employing the access information read out from the tag, reading out the product data file, comprising the encrypted product data and the encrypted document key, from the product data server, wherein upon receiving the encrypted document key and the public station key from the production station, the tag
- decrypts the encrypted document key with the private tag key to obtain a decrypted document key,
- newly encrypts the decrypted document key with the public station key obtained from the production station to obtain a re-encrypted document key, and
- provides the re-encrypted document key to the production station.

12. The method according to claim 11, further comprising the steps:
- upon the reading out of the access information from the tag: establishing a secure communication channel between the tag and the production station.

13. The method according to claim 12, wherein an authentication of the production station by way of the product data server, which is effected upon a mutual authentication, is carried out by means of an electively static or dynamic authentication token sent from the tag to the production station, and electively generated by the tag.

14. The method according to claim 11, further comprising the steps: upon the reading out of the access information from the tag, establishing a mutual authentication between the tag and the production station.

15. The method according to claim 11, further comprising:
- after the reading out of the access information from the tag, authenticating, by the production station, the access information by verifying a station signature added to the access information and generated with the private station key by means of the corresponding public station key or the tag signature generated with the private tag key by means of the corresponding public tag key.

16. A method for encrypting encrypted product data by a production station of a system for processing product data, the system including:
- a product data server configured to store a product data file, wherein the product data file comprises the product data encrypted with a document key,
- a product,
- a tag, attached to the product, configured to access information the provides access to the product data file stored on the product data server, an asymmetric key pair that comprises a private tag key and a public tag key, and an encryption device, the production station the product according to the product data and store an asymmetric key pair that comprises a public station key and a private station key, wherein the private tag key is inaccessible to the production station, wherein encrypting encrypted product data by the production station includes reading out encrypted product data by the production station, reading out the access information from the tag, and by the production station, while employing the access information read out from the tag, reading out the product data file, including the encrypted product data and an encrypted document key, from the product data server the method comprising the steps:
- by the production station, transferring the encrypted document key and the public station key to the tag;
- by the tag, receiving the encrypted document key and the public station key from the production station;
- by the tag, decrypting the encrypted document key with the private tag key to obtain a decrypted document key;
- by the tag, re-encrypting the document key from the public tag key to the public station key into a re-encrypted document key;
- by the tag, sending the re-encrypted document key to the production station;
- by the production station, decrypting the re-encrypted document key with the private station key;
- by the production station, decrypting the encrypted product data with the document key into plaintext product data.

17. A tag device, configured to be attached to a product, the tag device configured to enable a production station to process, including storing and reading out, encrypted product data from a product data server to the production station;
- wherein the product data server is configured to store a product data file, wherein the product data the comprises:
- product data encrypted with a document key, and
- the document key encrypted with a public tag key of an asymmetric key pair;
- wherein in the tag device is configured to store access information that provides access to the product data the stored on the product data server;
- wherein
  - the asymmetric key pair is stored in the tag device, comprising a private tag key and the public tag key, wherein the private tag key is inaccessible to the production station;
- wherein the tag device includes an encryption device, and wherein upon receiving the encrypted document key and a public station key from the production station, the tag is configured to
  - decrypt the encrypted document key with the private tag key to obtain a decrypted document key,
  - newly encrypt the decrypted document key with the public station key obtained from the production station to obtain a re-encrypted document key, and
  - provide the re-encrypted document key to the production station.

* * * * *